Patented Mar. 24, 1936

2,035,366

UNITED STATES PATENT OFFICE 2,035,366

PROCESS OF RECOVERING STRONTIUM

Harvey G. Elledge and Alfred Hirsch, Painesville, Ohio, assignors to Diamond Alkali Company, Painesville, Ohio, a corporation of Delaware No Drawing. Application June 4, 1934,
Serial No. 728,956

8 Claims. (Cl. 23—122)

This invention relates to a process for recovering strontium from sludges containing the same, and is in part a division of our copending application Serial No. 679,076 filed July 5, 1933.

In the process described in our said application and in a variation thereof described in a subsequent application (Serial No. 711,318, filed February 15, 1934), certain strontium compounds including the sulphate, the carbonate and the hydroxide are employed for the purpose of removing from caustic liquors certain impurities consisting principally of compounds of silicon, aluminum and iron. The resulting sludges contain these impurities in some manner combined with strontium as well as strontium carbonate adventitiously contained or resulting from the use of an excess of strontium compound later converted to carbonate and commingled with the sludges.

We have not determined the ultimate chemical nature of the various constituents of the sludges resulting from the process of our said application or to what extent or in what manner the chemical activity of compounds existing therein are affected or modified each by the presence of the other. We do know, however, that these sludges contain substantially all the strontium introduced as a purifying agent in the main process in the form of the carbonate or in some combination with one or more impurities or the reaction products thereof.

We have found that under certain circumstances it is possible very efficiently to recover from the sludges resulting from the process of our said application the strontium content in the form of the sulphate by the use of sulphuric acid. The sludges must be treated while still fresh, that is to say, before they have lost their water content to an extent which would result in such decrease in solubility of any strontium compound therein as to render its recovery impractical, a loss to this extent being herein termed a substantial loss of moisture, and must, for best results, be treated with a quantity of sulphuric acid substantially equal to or only slightly in excess of the theoretical calculated on the basis of the amount of strontium introduced as a purifying agent in the principal process. We have determined that the amount of sulphuric acid may be as much as two-tenths of one percent greater than this theoretical quantity without affecting the results, but as the amount is increased above this quantity the results become increasingly less satisfactory. As indicated above the process is successful as long as the sludges have not dried out to too low a moisture content but after such moisture content becomes small the results are progressively less satisfactory. It therefore follows that the treatment should be carried out while the precipitates are fresh and while they contain substantially the moisture content existing at the time of separation from the purified liquors or before substantial loss thereof has occurred. Where the treatment is to be deferred for a considerable time, water may be added to preserve or increase the moisture content beyond that existing at the time of separation of the sludges from the caustic liquor.

After the sludges have been washed with water to remove the sodium hydroxide present and have been treated with the slight excess of acid over the theoretical, as indicated, for a sufficient time to allow the reaction to run to substantial completion, which time may be five or ten minutes or more if desired, the liquid portion may be separated by filtration, decantation, or otherwise, from the strontium sulphate residue and the latter washed free of soluble matter with water. The alumina, silica and iron compounds pass to waste with the decantate or filtrate and the wash water.

Having thus described our invention, what we claim is:

1. The process which comprises treating the sludge resulting from the treatment of caustic liquors with a reagent of the group consisting of strontium sulphate, strontium hydroxide, strontium carbonate and mixtures thereof, and whose moisture content has been kept high enough to avoid substantial reduction of solubility in sulphuric acid, with a quantity of sulphuric acid substantially equal to the theoretical quantity required to react with the strontium reagent introduced into the caustic liquor.

2. The process which comprises treating the sludge resulting from the treatment of caustic liquors with a reagent of the group consisting of strontium sulphate, strontium hydroxide, strontium carbonate and mixtures thereof, and whose moisture content has been kept high enough to avoid substantial reduction of solubility in sulphuric acid, with a quantity of sulphuric acid in excess of, by an amount not substantially more than two-tenths of one percent, the theoretical quantity required to react with the strontium reagent introduced into the caustic liquor.

3. The process which comprises treating the sludge resulting from the treatment of caustic liquors with a reagent of the group consisting of strontium sulphate, strontium hydroxide, strontium carbonate and mixtures thereof, before a substantial loss of moisture has occurred, with a quantity of sulphuric acid not substantially less than the theoretical quantity required to react with the strontium reagent introduced into the caustic liquor.

4. The process which comprises treating the sludge resulting from the treatment of caustic liquors with a reagent of the group consisting of strontium sulphate, strontium hydroxide, strontium carbonate and mixtures thereof, before a substantial loss of moisture has occurred, with a quantity of sulphuric acid substantially equal a quantity of the theoretical quantity required to react with the strontium reagent introduced into the caustic liquor.

5. The process which comprises treating the sludge resulting from the treatment of caustic liquors with a reagent of the group consisting of strontium sulphate, strontium hydroxide, strontium carbonate and mixtures thereof, before a substantial loss of moisture has occurred, with a quantity of sulphuric acid in excess of, by an amount not substantially more than two-tenths of one percent, the theoretical quantity required to react with the strontium reagent introduced into the caustic liquor.

6. The process which comprises treating the sludge resulting from the treatment of caustic liquors with a reagent of the group consisting of strontium sulphate, strontium hydroxide, strontium carbonate and mixtures thereof, before a substantial loss of moisture has occurred, by washing such sludges with water to remove the sodium hydroxide content and then treating them with a quantity of sulphuric acid not substantially less than the theoretical quantity required to react with the strontium reagent introduced into the caustic liquor.

7. The process which comprises treating the sludge resulting from the treatment of caustic liquors with a reagent of the group consisting of strontium sulphate, strontium hydroxide, strontium carbonate and mixtures thereof, before a substantial loss of moisture has occurred, by washing such sludges with water to remove the sodium hydroxide content and then treating them with a quantity of sulphuric acid substantially equal to the theoretical quantity required to react with the strontium reagent introduced into the caustic liquor.

8. The process which comprises treating the sludge resulting from the treatment of caustic liquors with a reagent of the group consisting of strontium sulphate, strontium hydroxide, strontium carbonate and mixtures thereof, before a substantial loss of moisture has occurred, by washing such sludges with water to remove the sodium hydroxide content and then treating them with a quantity of sulphuric acid in excess of, by an amount not substantially more than two-tenths of one percent, the theoretical quantity required to react with the strontium reagent introduced into the caustic liquor.

HARVEY G. ELLEDGE.
ALFRED HIRSCH.